United States Patent [19]
Lysen

[11] Patent Number: 5,642,089
[45] Date of Patent: Jun. 24, 1997

[54] MAGNETIC HOLDER FOR CONTACT SENSOR

[75] Inventor: Heinrich Lysen, Ismaning, Germany

[73] Assignee: Pruftechnik Dieter Busch AG, Ismaning, Germany

[21] Appl. No.: 270,997

[22] Filed: Jul. 5, 1994

[30] Foreign Application Priority Data

Jul. 8, 1993 [DE] Germany ............... 43 22 825.9

[51] Int. Cl.$^6$ .................................................. H01F 7/20
[52] U.S. Cl. ............................................ 335/285; 335/298
[58] Field of Search .............................. 335/285–295, 335/296, 297, 298; 24/303; 294/65.5

[56] References Cited

U.S. PATENT DOCUMENTS 3,477,050  11/1969  Hinger ............................ 294/65.5
4,652,845   3/1987  Finkle ............................. 335/285

Primary Examiner—Lincoln Donovan
Attorney, Agent, or Firm—Kirkpatrick & Lockhart LLP

[57] ABSTRACT

Holding device for magnetically mounting a contact sensor on a curved magnetic surface, for example on a pipeline or on a housing of a bearing, comprising at least two movable pole shoes having the same poling and, in the neighbourhood thereof, a plunger-like pole shoe with opposite poling. The plunger-like pole shoe is displaceable relative to the other pole shoes and the magnets and, upon contacting of the holding device is displaced towards the mounting surface by the magnetic force.

15 Claims, 1 Drawing Sheet

MAGNETIC HOLDER FOR CONTACT SENSOR

TECHNICAL FIELD OF THE INVENTION

The invention relates to a holding device for magnetically mounting a contact sensor on a curved, magnetisable surface.

BACKGROUND OF THE INVENTION AND PRIOR ART

DE 36 28 544 A1 discloses a magnetic holder for providing attachment to a magnetisable surface, in which the contact assembly is made up of members which are fed from a magnet. The members, flat pole shoe plates, are displaceable in parallel to one another, so that the contact assembly can be closely adapted to any form of surface. After the adaptation of the assembly of members to the contact surface, the individual plate members are locked one with another and fixed in place. The assembly of members is held on the contact surface by magnetic force. It is, however, disadvantageous that with such a holding device the assembly of members must always be newly adapted upon a change of the contact surface, that the magnetic retaining force is relatively small and, in particular, that the variable form of the assembly of members, along with the overall construction of the magnetic holder, affects the measured values of particular kinds of contact sensors, in particular vibration sensors.

DE 29 40 212 C2 describes a magnetic mounting device with at least two soft ferromagnetic pole shoes which are fed from a plurality of magnets. The pole shoes are fed both from a main magnet arranged between them and from surrounding secondary magnets which are so oriented that they offer in each case poles of the same polarity towards the respective pole shoes. The poles of the secondary magnets facing away are bridged by a magnetic yoke. This magnetic holder is characterized by a large magnetic holding force, or by a high magnetic energy density at the holding surface, but in substance this is so only for flat plane surfaces. The above-mentioned magnetic mounting device is not suitable for curved surfaces.

Attachment or holding on a magnetisable surface can also be achieved by a horseshoe magnet or a pot-shaped magnet which, for increasing the holding force and for overcoming unevennesses, can have movable pole shoes at the sides. Such magnetic holders are primarily used as door holders or cupboard door catches. They are, however, of only limited suitability for contacting curved surfaces. The pole shoes at the sides, with the magnet between them, form a bridge when contacted to a curved surface, the self-vibration of which bridge has a negative effect in particular in the case of vibration sensors. The self-vibrations are particularly disruptive when complex vibration data from bearings or shafts is to be evaluated.

OBJECT OF THE INVENTION

It is the object of the invention to provide a magnetic holder which overcomes the above-mentioned disadvantages of the prior art. The magnetic holder should possess a large holding force on curved surfaces and should also be suitable for contact sensors such as vibration detectors; that is, the magnetic holder should not affect the detection of the measurement values from the surface of the object of measurement.

SUMMARY OF THE INVENTION

According to the present invention there is provided a holder device for magnetically mounting an object, in particular a contact sensor, on a magnetisable surface of a flat or curved body, such as a pipeline or a housing of a bearing, comprising at least two separately moveable pole shoes which are fed from magnetic cores, wherein, the separately moveable pole shoes have the same poling and are arranged spaced apart in the holding device, a plunger-like pole shoe, having an opposite poling, fed from magnetic cores is arranged in the neighbourhood of the spaced-apart pole shoes having the same poling, the plunger-like pole shoe is displaceable relative to the other pole shoes and the magnets is preferably a part of the object to be mounted on the magnetisable surface, and optionally carries a defined magnetisable contact plate for the contact with the magnetisable contact surface; and a housing or a frame holds or guides the displaceable plunger-like pole shoe, the separately moveable shoes and the magnetic cores, such that after the contacting of the holding device the separately movable pole shoes project out of the holding device and contact the magnetisable surface of the flat or curved body, the plunger-like pole shoe is displaced by the magnetic force to the surface of the body and the magnetic circuit from the separately moveable pole shoes through the surface of the flat or curved body, and through to the plunger-like pole shoe is closed.

Generally, a magnetic holder embodying the present invention has a housing with separately movable pole shoes of the same polarity and a plunger-like pole shoe of opposite polarity which, upon contacting of the magnetic holder to a magnetisable surface, is attracted to the object by the magnetic forces. The separately movable pole shoes together with the displaceable pole plunger determine the magnetic holding force. It is of significance for the invention that the moveable pole shoes, fed from the magnetic cores, are arranged with a spacing, most preferably outwardly, in the housing, and have the same polarity; that a plunger-like pole shoe fed from magnetic cores is arranged neighbouring the spaced-apart pole shoes and has the opposite polarity; that the plunger-like pole shoe is displaceable relative to the moveable pole shoes and the magnets, is preferably a part of the object to be mounted or of the contact sensor and optionally carries a defined, magnetisable contact plate; that a housing or frame of non-magnetisable material so holds or guides the displaceable plunger-like pole shoe, the separately moveable pole shoes and the magnetic cores such that after contacting of the magnetic holder the moveable pole shoes protrude at the sides and contact the surface of the flat or curved body to be contacted, to which surface the plunger-like pole shoe, oppositely polarized to the pole shoes, is attracted and a magnetic circuit is closed, whereby the force lines extend from the outer pole shoes of similar polarity through the magnetisable mounting surface of the body to be contacted to the single plunger-like pole shoe of different polarity.

Such a magnetic holder has the advantage that upon contact the magnetic forces close the magnetic circuit quasi automatically by means of the displaceable pole plunger. Even with a change of the surface to be contacted the pole shoes do not need to be manually adjusted. At the same time an inherently stable and vibration free magnetic holder is provided. Moreover, by means of the arrangement of the poles and the magnetic cores, the force lines at the pole plunger are concentrated so that a particularly firm magnetic force attachment between the pole plunger, which is preferably also a sensor plunger, and the object surface arises.

Since the pole- and sensor plunger always stands vertically on the object surface, and because of the good force connection between the magnetisable surface and the plunger, the magnetic holder in accordance with the invention is particularly suitable for vibration sensors. Moreover, the self-vibrations of the holder on itself and on the contact surface are—in comparison to sensing tips—very small. With a magnetic holder in accordance with the invention the self-vibration can for example be raised above 20 to 25 kHz, while the above-mentioned prior art holders with sensing tips and/or pot- or horseshoe-like magnet constructions normally suffer self-vibration between 3 and 5 kHz. These frequencies, however, lie in the relevant range of vibrations of shafts and rotation bearings and disrupt the evaluation of the vibration spectrum, for example for the alignment and adjustment of rotating machine equipment.

In a preferred embodiment, the plunger-like pole shoe is constructed for detecting vibration and/or acceleration quantities. The pole shoe or the contact sensor is, however, also suitable for detecting other measured quantities such as temperatures.

The magnetic cores are preferably permanent magnets, although naturally electromagnets are also suitable. The moveable pole shoes are, expediently, of ferromagnetic material. This applies also to the shaft of the pole-plunger between the magnetic cores. The contact plate of the pole-plunger is also of magnetisable, preferable of ferromagnetic, material, in order to achieve a high magnetic field density at the mounting surface and in particular at the displaceable plunger.

The shaft of the plunger-like pole shoe is, in a preferred embodiment, arranged between two magnetic cores and the moveable pole shoes are arranged at the pole ends outwardly remote from the shaft. The shaft of the plunger-like pole shoe is generally rectangular or quadratic which, together with substantially quadratic- or cylinder-like magnetic cores, allows a particularly compact construction of the holder. It is further preferred that the spaced-apart pole shoes are plate-like and each freely moveable, floating, mounted on a boss. The boss can be formed in one peace with the housing or frame. In order to increase the free mobility of the outwardly lying outer pole shoes, play is provided between the outwardly lying moveable pole shoes and the housing or frame, so that the pole shoe plates can, upon contact, tilt slightly if necessary.

In accordance with the invention, the housing or the housing frame is of non-magnetisable material. It is important for providing a stable holder, and for avoiding self-vibration, that the plunger-like pole shoe is guided with a close fit in the holder. This is provided most efficaciously directly by the abutting magnetic cores, if appropriate together with guide holes in the housing or frame.

The invention is not restricted to the use of two magnetic cores for feeding the pole shoes. In accordance with the invention a number of magnetic cores may be arranged in a complex arrangement, if appropriate separated by non-magnetisable material or housing and guide walls, around the shaft of the displaceable pole plunger. The separately moveable pole shoes then lie on the outer pole ends remote from the shaft.

BRIEF DESCRIPTION OF THE DRAWINGS

Further advantages and embodiments of the invention will be understood from the examples and the drawings.

DETAILED DESCRIPTION OF PREFERRED EMBODIMENTS ACCORDING TO THE INVENTION

Figure 1:
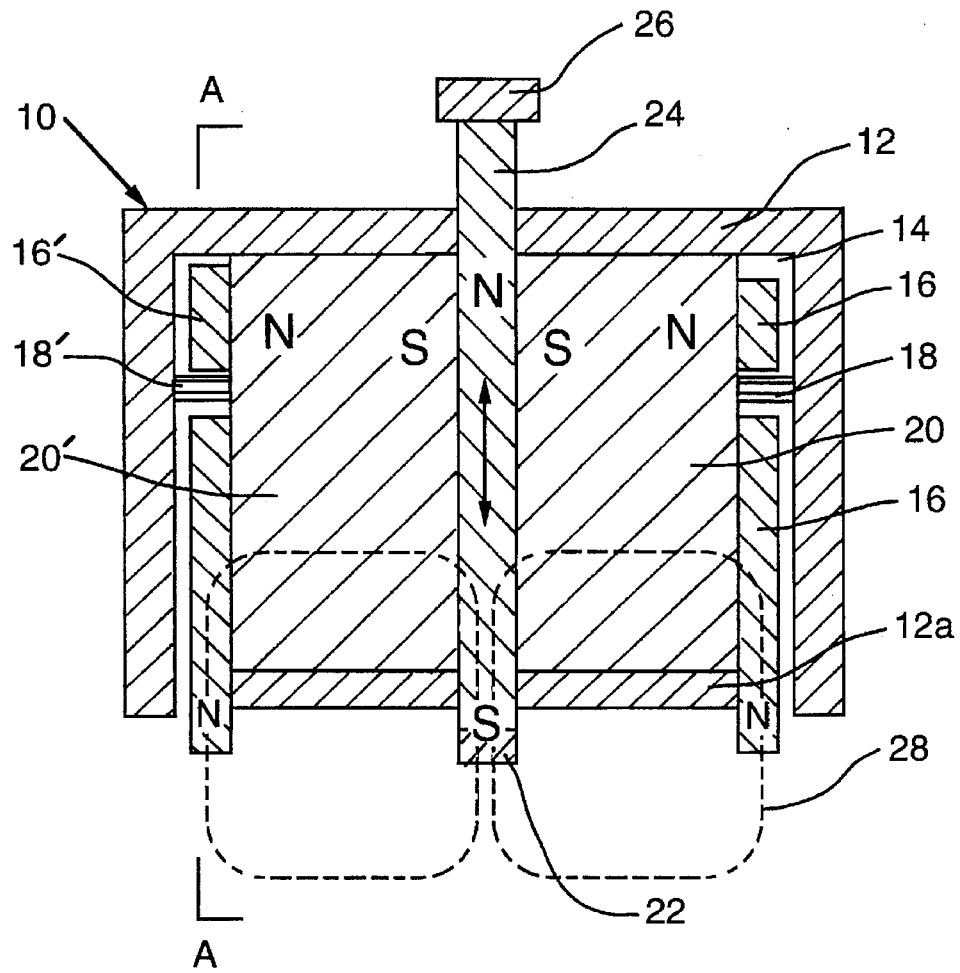
FIG. 1 shows an outline of the magnetic holder in accordance with the invention.

See FIG. 1. The magnetic holder 10 has two plate-like pole shoes 16, 16' spaced apart in a housing 12, which pole shoes are each fed from a permanent magnet 20, 20' and have the same polarity. The polarity of the permanent magnets, and of the pole shoes, is indicated by N and S for North pole and South pole, by way of example. The polarities can, as a whole, be reversed. A rectangular pole plunger 24 is located between the two quadratic permanent magnets 20, 20', the pole plunger being displaceable substantially in parallel to the housing 12, the magnets 20, 20' and the outwardly disposed pole shoes 16, 16'. Upon contacting of the holder 10 to a magnetisable surface (not shown) the pole plunger 24 is displaced towards the contact surface by magnetic forces, schematically illustrated by force lines 28. If the pole plunger 24 projects too far forward it is mechanically displaced backwards by the contact surface (see the double arrow). The pole shoes 16, 16' to the sides and the middle pole plunger 24 project from the housing 12. Upon contacting of the holder 10 to the mounting surfacer only they touch the mounting surface. The magnets 20, 20' are fixedly held in the housing by the housing floor 12a. The magnets 20, 20' can thus simultaneously serve as guides for the middle pole plunger 24. Preferably, the pole plunger 24 carries a standardised contact plate 22 of magnetisable material. The shaft of the pole plunger 24 and the pole shoes 16, 16' are of ferromagnetic material-contrast, the housing 12 is of non-magnetisable material, preferably of VA-steel, aluminium or plastics. At the rear-upper-end the pole plunger 2, carries a connection 26 for a sensor unit such as a vibration detector.

Figure 2:
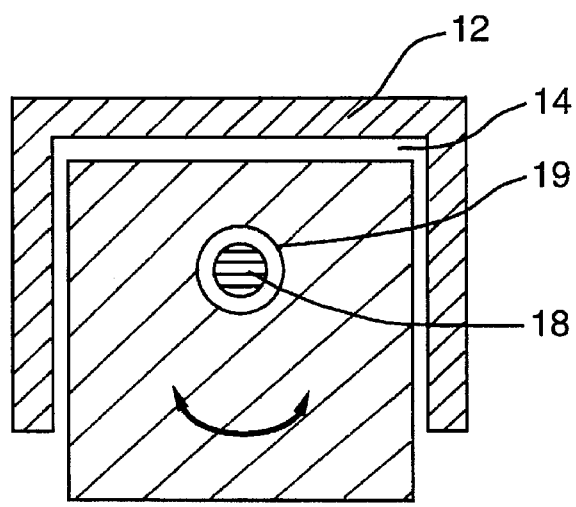
FIG. 2 shows a section through the magnetic holder along the line A—A of FIG. 1.

See FIGS. 1 and 2. The plate-form pole shoes 16, 16' to the side are mounted freely movably and with play 14 in the housing 12, on a boss 18. See FIG. 2, which provides a section along the line A—A of FIG. 1. The hole 19 in the pole plate 16 is made larger than the boss 18. The pole plates can thus not only laterally or longitudinally tilt (see double arrow in FIG. 2), but can also move somewhat towards the mounting surface. Upon contacting of the magnetic holder to a magnetisable surface with the illustrated polarity of the pole shoes 24, 16, 16' a magnetic circuit 28 is closed which extends from the outer pole shoes 16, 16' through the mounting surface to the middle plunger 24. The contact sensor can be removed from the mounting surface by pulling off, tilting, or sliding.

What is claimed is:

1. Magnetic holder for magnetically mounting an object, in particular a contact sensor, on a magnetisable surface of a flat or curved body, such as a pipeline or a housing of a bearing, comprising at least two separately moveable pole shoes which are fed from magnetic cores, wherein, the separately moveable pole shoes have the same poling and are arranged spaced apart in the magnetic holder, a plunger-like pole shoe, having an opposite poling, fed from the magnetic cores is arranged in the neighbourhood of the spaced-apart pole shoes having the same poling, the plunger-like pole shoe is displaceable relative to the separately moveable pole shoes and the magnetic cores; and a housing holds the displaceable plunger-like pole shoe, the separately moveable pole shoes and the magnetic cores, such that after the contacting of the holding device the separately movable pole shoes project out of the holding device and contact the magnetisable surface of the flat or curved body, the plunger-like pole shoe is displaced by the magnetic force to the surface of the body and the magnetic circuit from the separately moveable pole shoes through the surface of the flat or curved body, and through to the plunger-like pole shoe is closed.

2. Magnetic holder according to claim 1, wherein the magnetic cores are permanent magnets and the pole shoes are of ferromagnetic material.

3. Magnetic holder according to claim 1, wherein the shaft of the plunger-like pole shoe is arranged between two of said magnetic cores and the movable pole shoes are arranged on the pole ends of the magnetic cores lying outwardly of and remote from the shaft.

4. Magnetic holder according to claim 3, wherein the shaft of the plunger-like pole shoe is formed to be rectangular or quadratic, and the magnetic cores are substantially quadratic or cylinder-like and act both upon the displaceable plunger-like and the movable pole shoes.

5. Magnetic holder according to claim 1, wherein the separately moveable pole shoes are each mounted floatingly on a boss.

6. Magnetic holder according to claim 1, wherein play is provided between the separately lying movable pole shoes and the housing or frame.

7. Magnetic holder according to claim 1, wherein the housing or the frame is of non-magnetisable material and the magnetic cores together with the housing provide a guide for the plunger-like pole shoe.

8. Magnetic holder according to claim 1, wherein the magnetic cores are arranged around the shaft of said plunger-like pole shoe, and the separately moveable pole shoes are arranged at the outwardly lying pole ends of the magnetic cores remote from the shaft.

9. The magnetic holder of claim 1, wherein said plunger-like pole shoe is a part of the object to be mounted on the magnetizable surface.

10. The magnetic holder of claim 1, wherein said plunger-like pole shoe includes a defined magnetisable contact plate for contact with the magnetizable contact surface.

11. The magnetic holder of claim 1, wherein said plunger-like pole shoe transmits vibration and/or acceleration parameters to the contact sensor.

12. The magnetic holder of claim 8, further comprising a non-magnetizable material separating the magnetic cores.

13. A sensing device used with a magnetisable surface, comprising:

a magnetic holder having at least two magnetic cores and at least two separately moveable pole shoes which are fed from the magnetic cores, the separately moveable pole shoes have the same poling and are arranged spaced apart in said magnetic holder, a plunger-like pole shoe, having an opposite poling from the moveable pole shoes and fed from the magnetic cores is arranged in the neighbourhood of the spaced-apart pole shoes having the same poling, the plunger-like pole shoe is displaceable relative to the separately moveable pole shoes; and a housing or a frame holds the displaceable plunger-like pole shoe, the separately moveable pole shoes and the magnetic cores, such that after the contacting of said magnetic holder the separately movable pole shoes project out of the magnetic holder and contact the magnetisable surface of the flat or curved body, the plunger-like pole shoe is displaced by the magnetic force to the surface of the body and the magnetic circuit from the separately moveable pole shoes through the surface of the flat or curved body, and through to the plunger-like pole shoe is closed; and a sensor mounted on said magnetic holder.

14. The sensing device of claim 13, wherein said sensor is selected from the group consisting of a contact sensor, a vibration sensor, and an acceleration sensor.

15. The sensing device of claim 13, wherein said plunger-like pole shoe transmits vibration and/or acceleration parameters to said sensor.

* * * * *